United States Patent
Song et al.

(10) Patent No.: US 10,057,094 B2
(45) Date of Patent: Aug. 21, 2018

(54) APPARATUS AND METHOD FOR SINGLE ANTENNA INTERFERENCE CANCELLATION (SAIC) ENHANCEMENT

(71) Applicant: Samsung Electronics Co., Ltd., Gyeonggi-do (KR)

(72) Inventors: Kee-Bong Song, San Diego, CA (US); Shuangquan Wang, San Diego, CA (US); Hairuo Zhuang, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/247,535

(22) Filed: Aug. 25, 2016

(65) Prior Publication Data

US 2017/0331654 A1   Nov. 16, 2017

Related U.S. Application Data

(60) Provisional application No. 62/334,356, filed on May 10, 2016, provisional application No. 62/337,595, filed on May 17, 2016.

(51) Int. Cl.
*H04L 25/03* (2006.01)
*H04L 27/233* (2006.01)
(Continued)

(52) U.S. Cl.
CPC ........... *H04L 27/2334* (2013.01); *H04B 1/10* (2013.01); *H04L 25/03292* (2013.01); *H04L 27/22* (2013.01)

(58) Field of Classification Search
CPC .......................... H04L 1/0045; H04B 7/0845
See application file for complete search history.

(56) References Cited

U.S. PATENT DOCUMENTS 7,567,635 B2   7/2009 Scheim et al.
7,924,933 B2   4/2011 Prasad et al.
(Continued)

FOREIGN PATENT DOCUMENTS

WO    WO 2007019681    2/2007

OTHER PUBLICATIONS

Meyer, Raimund et al., Efficient receivers for gsrn muros downlink transmission, 2009 IEEE 20th, International Symposium on Personal, Indoor and Mobile Radio, Communications. Sep. 16, 2009, pp. 2399-2403, IEEE.

(Continued)

*Primary Examiner* — David S Huang
(74) *Attorney, Agent, or Firm* — The Farrell Law Firm, P.C.

(57) ABSTRACT

An interference cancellation (IC) processor, a method, a method of manufacturing a semiconductor device, and a method of constructing an integrated circuit are provided. The IC processor includes a plurality of mono interference cancellation (MIC) filter estimation processors; a combined effective channel calculation processor; a combined filter calculation processor; and a combined filter processor, including a first input connected to the output of the combined filter calculation processor, a second input for receiving a signal for setting a length of the combined filter that is connected to a second input of the IC processor, a third input connected to the input of the MIC-BRC processor, and an output for providing a filtered output of a de-rotated GMSK signal that is connected to a second output of the IC processor that provides a filtered output $y_i$ of the de-rotated GMSK signal.

20 Claims, 6 Drawing Sheets

(51) Int. Cl.
 *H04L 27/22* (2006.01)
 *H04B 1/10* (2006.01)

(56) References Cited

U.S. PATENT DOCUMENTS

| | | | |
|---|---|---|---|
| 8,693,602 | B2 | 4/2014 | Chevalier et al. |
| 8,798,176 | B2 | 8/2014 | Cairns et al. |
| 9,866,411 | B1* | 1/2018 | Song ................. H04L 25/03057 |
| 2002/0141437 | A1* | 10/2002 | Meyer .................. H04B 7/0845 370/442 |
| 2003/0016637 | A1* | 1/2003 | Khayrallah .......... H04B 7/0615 370/329 |
| 2007/0127608 | A1 | 6/2007 | Scheim et al. |
| 2009/0052591 | A1* | 2/2009 | Chen ................. H04L 25/03318 375/341 |
| 2010/0136940 | A1 | 6/2010 | Hui et al. |
| 2017/0033949 | A1* | 2/2017 | Eitan .................. H04L 25/0204 |

OTHER PUBLICATIONS

Gerstacker, Wolfgang at al., GSM/EDGE: a mobile communications system determined to stay, International Journal of Electronics and Communications (AEU), Jan. 10, 2011, pp. Jan. 10, 2011, pp. 694-700.

Huang, Wenjie, et al., Widley Linear MIMO MMSE Filter and Joint MLSE for VAMOS, Thesis presented to the University of Waterloo, 2010, pp. 1-68. Waterloo, Ontario, Canada.

Kim, Kihong, Interference mitigation in wireless communications, Thesis presented to School of Electrical and Computer Engineering, Georgia Institure of Technology Aug. 23, 2005. pp. 1-134, ProQuest Information and Learning Company, Ann Arbor, MI.

Meyer, Raimund, et al., A Single Antenna Interference Cancellation Algorithm for Increased GSM Capacity, Jul. 2006, pp. 1616-1621 IEEE Transactions on Wireless Communications, vol. 5, No. 7.

* cited by examiner

APPARATUS AND METHOD FOR SINGLE ANTENNA INTERFERENCE CANCELLATION (SAIC) ENHANCEMENT

PRIORITY

This application claims priority under 35 U.S.C. § 119(e) to U.S. Provisional Patent Applications filed on May 10, 2016 and May 17, 2016 in the United States Patent and Trademark Office and assigned Ser. Nos. 62/334,356 and 62/337,595, respectively, the entire contents of each of which are incorporated herein by reference.

FIELD

The present disclosure relates generally to communication technology, and more particularly, to an apparatus and method for single antenna interference cancellation (SAIC).

BACKGROUND

In a communication network (e.g., a second generation (2G) Global System for Mobile Communications (GSM) network), system capacity is often limited by co-channel interference (CCI) due to channel re-use.

GSM uses a combination of time division multiple access (TDMA) and frequency division multiple access (FDMA). Gaussian minimum shift keying (GMSK) modulation is used in GSM such that unwanted or spurious emissions outside the nominal bandwidth are sufficiently low to enable adjacent channels to be used from the same base station.

Data transported by a carrier provides up to eight different users by splitting the carrier into eight time slots, using a TDMA scheme. Thus enables different users of a single radio frequency (RF) channel to be allocated in different time slots. Different users are then able to use the same RF channel without mutual interference. A GSM burst is a transmission made in a time slot, where a burst includes three tail bits at the start of the GSM burst to provide time for a transmitter to ramp up its power, 57 data bits used to carry information, one flag bit to indicate the type of data in the previous field, 26 bits for a training sequence (TS) that is used as a timing reference and for equalization, 1 flag bit to indicate the type of data in the data field, 57 bits of data, 3 tail bits to allow time for a transmitter to ramp down its power, and 8.25 bits to provide a guard time at the end of a GSM burst.

A basic GSM receiver simply treats CCI as additive white Gaussian noise (AWGN), thus resulting in inferior performance. Unlike white Gaussian noise, which is uncorrelated in both time and space, interference typically has a strong correlation in time and space, i.e., the interference is colored. In a wireless communication system with multiple receive antennas, interference may be mitigated through an interference whitening technique, which exploits the correlation of a received signal among multiple receive antennas. Since a GSM system typically uses only a single receive antenna, an interference whitening technique cannot be directly applied. However, a GMSK signal may be approximated by a binary phase shift keying (BPSK) signal with consecutive 90 degree phase rotations. If I and Q are treated as two signal dimensions, BPSK is a one dimensional signal, unlike quadrature phase shift keying (QPSK) and other quadrature amplitude modulation (QAM) schemes that occupy both I and Q dimensions. Therefore, for BPSK or GSMK signals, even with a single receive antenna, it is feasible to perform interference suppression through certain signal space projection, which is commonly referred to as SAIC.

SUMMARY

According to one embodiment, an interference cancellation (IC) processor includes a plurality of mono interference cancellation (MIC) filter estimation processors, wherein each of the plurality of MIC filter estimation processors has a different equalizer offset $k_0$ and includes an input connected to a first input of the MIC-BRC processor, a first output that provides a residual channel $h_i$, and a second output that provides an estimated filter $p_i$; a combined effective channel calculation processor, including a plurality of inputs, wherein each of the plurality of inputs is connected to one of the first outputs of the plurality of MIC filter estimation processors, and an output that provides a combined channel $h_{res}$ that is connected to a first output of the IC processor; a combined filter calculation processor, including a plurality of inputs, wherein each of the plurality of inputs is connected to one of the second outputs of the plurality of MIC filter estimation processors, and an output for providing a combined filter; and a combined filter processor, including a first input connected to the output of the combined filter calculation processor, a second input for receiving a signal for setting a length of the combined filter that is connected to a second input of the IC processor, a third input connected to the input of the MIC-BRC processor, and an output for providing a filtered output of a de-rotated GMSK signal that is connected to a second output of the IC processor that provides a filtered output $y_i$ of the de-rotated GMSK signal.

According to one embodiment, a method of combining channels of a de-rotated GMSK signal by an IC processor includes generating a residual channel $h_i$ by each of a plurality of MIC filter estimation processors, wherein each of the plurality of MIC filter estimation processors has a different equalizer offset $k_0$; and generating a combined channel $h_{res}$ from each residual channel $h_i$ by a combined effective channel calculation processor.

According to one embodiment, a method of manufacturing a semiconductor device includes forming the semiconductor device as part of a wafer or package that includes a front end receiver, including an input to receive a Gaussian minimum shift keying (GMSK) signal, and an output; a GMSK signal de-rotation processor configured to de-rotate the received GMSK signal, including an input connected to the output of the front end receiver, and an output; a mono interference cancellation (MIC) branch combining (MIC-BRC) processor, including a first input connected to the output of the GMSK signal de-rotation processor, a second input, a first output for providing a combined channel, and a second output for providing a filtered output $y_i$ of the de-rotated GMSK signal; an adaptive filter length selection processor, including an input connected to the first output of the MIC-BRC processor, and an output connected to the second input of the MIC-BRC processor for determining a length of the filtered output of the de-rotated GMSK signal; a maximum-likelihood sequence estimation (MLSE) equalizer, including a first input connected to the first output of the MIC-BRC processor, a second input connected to the second output of the MIC-BRC processor, a first output for providing a hard decision of the filtered output of the de-rotated GMSK signal, and a second output for providing a soft decision of the filtered output of the de-rotated GMSK signal; an interference cancelled metric (ICM) based log-likelihood ratio (LLR) scaling processor, including a first input connected to the first output of the MIC-BRC processor, a second input connected to the second output of the MIC-BRC processor, a third input connected to the first output of the MLSE equalizer, a fourth input connected to the second output of the MLSE equalizer, and an output; a burst combiner and de-interleaver, including an input connected to the output of the ICM based LLR scaling processor, and an output; and a Viterbi decoding and cyclic redundancy check (CRC) processor, including an input connected to the output of the burst combiner and de-interleaver, and an output; and testing the semiconductor device, wherein testing of the semiconductor device is performed using at least one electrical to optical converter, at least one optical splitter that splits an optical signal into at least two optical signals, and at least one optical to electrical converter.

According to one embodiment, a method of constructing an integrated circuit includes generating a mask layout for a set of features for a layer of the integrated circuit, the mask layout having standard cell library macros for a front end receiver, including an input to receive a Gaussian minimum shift keying (GMSK) signal, and an output; a GMSK signal de-rotation processor configured to de-rotate the received GMSK signal, including an input connected to the output of the front end receiver, and an output; a mono interference cancellation (MIC) branch combining (MIC-BRC) processor, including a first input connected to the output of the GMSK signal de-rotation processor, a second input, a first output for providing a combined channel, and a second output for providing a filtered output $y_i$ of the de-rotated GMSK signal; an adaptive filter length selection processor, including an input connected to the first output of the MIC-BRC processor, and an output connected to the second input of the MIC-BRC processor for determining a length of the filtered output of the de-rotated GMSK signal; a maximum-likelihood sequence estimation (MLSE) equalizer, including a first input connected to the first output of the MIC-BRC processor, a second input connected to the second output of the MIC-BRC processor, a first output for providing a hard decision of the filtered output of the de-rotated GMSK signal, and a second output for providing a soft decision of the filtered output of the de-rotated GMSK signal; an interference cancelled metric (ICM) based log-likelihood ratio (LLR) scaling processor, including a first input connected to the first output of the MIC-BRC processor, a second input connected to the second output of the MIC-BRC processor, a third input connected to the first output of the MLSE equalizer, a fourth input connected to the second output of the MLSE equalizer, and an output; a burst combiner and de-interleaver, including an input connected to the output of the ICM based LLR scaling processor, and an output; and a Viterbi decoding and cyclic redundancy check (CRC) processor, including an input connected to the output of the burst combiner and de-interleaver, and an output; disregarding relative positions of the macros for layout design rule compliance during generation of the mask layout; monitoring the relative positions of the macros for layout design rule compliance after disregarding the relative positions; upon detection of layout design rule noncompliance of the macros, generating an adapted mask layout by adapting the noncompliance macros for layout design rule compliance; generating a mask according to the adapted layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
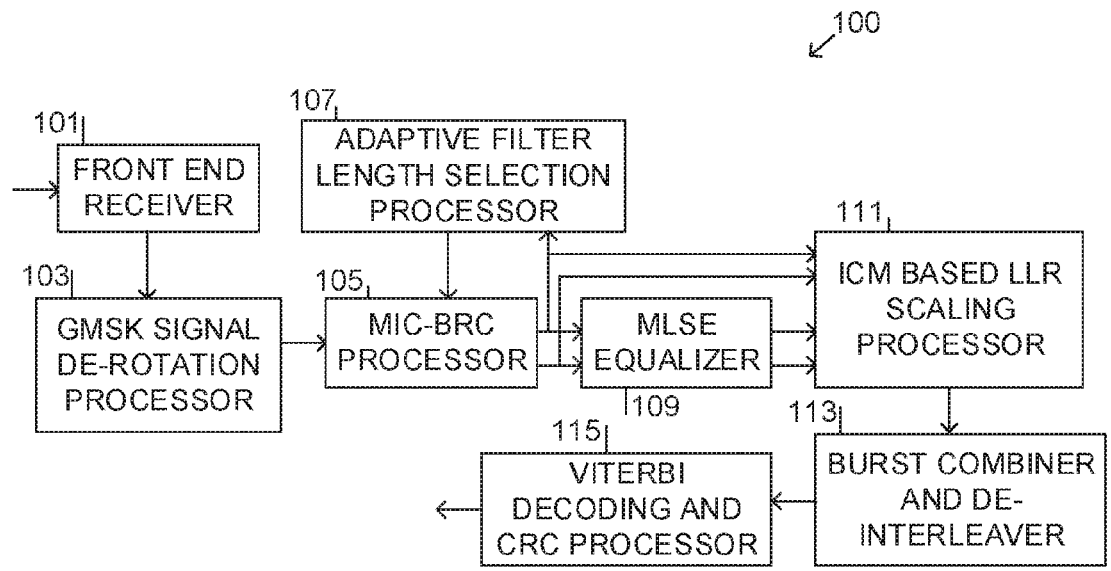
FIG. 1 is a block diagram of a GSM receiver, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

If interference is a GMSK modulated signal, a de-rotated received signal of a GSM user may be expressed in Equation (1) as follows:

$$r[t] = \Sigma_{l=0}^{Q_h} h[l]a[t-l] + \Sigma_{m=0}^{Q_g} g[m]b[t-m] + n[t] \quad (1)$$

where a is a data bit {+1, −1} of a signal, b is a data bit {+1, −1} of an interfering signal, h and g are channel impulse responses for a and b, respectively, and n[t] is AWGN.

According to one embodiment, an SAIC method includes determining a complex projection vector [p[0], p[1], ..., p[$Q_p$]], a real equivalent channel [d[0], d[1], ... d[$Q_d$]], and a non-negative integer $k_0$ such that the projection output $r_{prj}[t]$ is modelled in Equation (2) as follows:

$$r_{prj}[t] = \Sigma_{l=0}^{Q_d} d[l]a[t-k_0-l] + err[t] \quad (2)$$

where err[t] is a residue error and the projection output is expressed in Equation (3) as follows:

$$r_{prj}[t] := Re\{\Sigma_{l=0}^{Q_p} p[l] r[t-l]\} \quad (3)$$

Since [d[0], d[1], ..., d[$Q_d$]] is a vector, inter-symbol interference (ISI) is not removed by the projection method. However, the SAIC method may reduce the residue error term err[t] to make err[t] appear to be AWGN. A receiver may apply a maximum-likelihood sequence estimation (MLSE) equalizer to the projected output $r_{prj}[t]$ and equivalent channel [d[0], d[1], ..., d[$Q_d$]] instead of the original received signal and channel to improve performance.

According to one embodiment, a SAIC method includes a mono interference cancellation (MIC) method. The MIC method minimizes the residue error term err[t] in Equation (2) above.

According to one embodiment, another SAIC method includes a virtual diversity combining (VDC) method. The VDC method projects a received signal in different directions such that the residue error of each projection direction has unit power and is uncorrelated with the residue error of the other projection directions. The maximum ratio combining (MRC) may be performed before MLSE equalization to provide a diversity gain such that the combined signal to noise ratio (SNR) is higher than any single branch.

The VDC method generally has better performance than MIC. However, VDC is more complex than MIC, because VDC requires an eigenvalue decomposition of a $Q_p+1$ dimensional matrix. In addition, the performance of the VDC method is very sensitive to numerical error.

The MIC method has lower complexity and inferior performance as compared to the VDC method.

In an embodiment of the present disclosure, an enhanced SAIC method provides MIC with branch combining (MIC-BRC) to improve performance over the MIC method. MIC-BRC performs comparably to a VDC method, but with lower complexity than the VDC method, because MIC-BRC does not require eigenvalue decomposition as doe the VDC method.

In MIC-BRC, each virtual channel is called a branch and is formulated by choosing a different equalizer offset $k_0$. For example, for $k_0$=1, 2, and 3, three branches are formulated, where each branch is processed using the MIC method. The three MIC-processed branches are then combined using either weighted combining or equal weighted combining.

Since each burst in a code block generally experiences different fading conditions, proper scaling of soft decisions for each burst is needed to estimate an actual LLR based on an ICM after MLSE equalization, where LLR scaling may improve decoding performance.

An LLR scaling method based on an existing TS uses soft bits of the training sequence from MLSE equalization to estimate an LLR scaling factor. Due to the limited number of symbols in a TS, estimating an LLR scaling factor using a TS may not be very accurate.

To improve the accuracy of estimating an LLR scaling factor, the entire burst may be used instead of only the TS.

In an embodiment of the present disclosure, a hard decision of an MLSE equalizer is used to remove ISI of a filtered, or matched filter, output of a MIC-BRC processor. Then, the symbols of an entire burst (including TS symbols and hard decisions from the data symbols) are used to calculate an LLR scaling factor.

For both the VDC method and the MIC method, different filter lengths are needed for different downlink advanced receiver performance (DARP) test scenarios (DTSs) to achieve optimal performance. For the MIC method, a longer filter length (e.g., $Q_p$=2, $Q_d$=3) may work better in a DTS for synchronous single co-channel interference (DTS-1). However, in non-DTS-1 cases (e.g., DTS for synchronous multiple interferers (DTS-2)), a shorter filter length (e.g., $Q_p$=1, $Q_d$=2) may work better. Thus, a UE should be capable of distinguishing DTS-1 environments from non-DTS-1 environments in order to select the best parameters based on the detected DTS.

In an embodiment of the present disclosure, the filter length of an MIC-BRC processor is selected on the fly for the MIC-BRC processor based on a center of gravity (CoG) of a residue channel after MIC processing.

FIG. 1 is a block diagram of a GSM receiver 100, according to an embodiment of the present disclosure.

Referring to FIG. 1, the GSM receiver 100 includes a front end receiver 101, a GMSK signal de-rotation processor 103, a MIC-BRC processor 105, an adaptive filter length selection processor 107, an MLSE equalizer 109, an ICM based LLR scaling processor 111, a burst combiner and de-interleaver 113, and a Viterbi decoding and cyclic redundancy check (CRC) processor 115. In an embodiment of the present disclosure, the front end receiver 101, the GMSK signal de-rotation processor 103, the MIC-BRC processor

105, the adaptive filter length selection processor 107, the MLSE equalizer 109, the ICM based LLR scaling processor 111, the burst combiner and de-interleaver 113, and the Viterbi decoding and cyclic redundancy check (CRC) processor 115 may be included in one processor (e.g., a digital signal processor (DSP)) or may each be realized in more than one processor.

The front end receiver 101 includes an input for receiving a GMSK signal, and an output.

The GMSK signal de-rotation processor 103 includes an input connected to the output of the front end receiver 101, and an output. The GMSK signal de-rotation processor 103 approximates the received GMSK signal as a BPSK signal with consecutive 90 degree phase rotations.

The MIC-BRC processor 105 includes a first input connected to the output of the GMSK signal de-rotation processor 103, a second input, a first output, and a second output. The first input of the MIC-BRC processor 105 receives a BPSK approximation of the received GSMK signal from the GMSK signal de-rotation processor 103. The second input of the MIC-BRC processor 105 receives a signal for determining the length of the filter of the MIC-BRC processor 105 (e.g., a longer length for a DTS-1 scenario or shorter length for a non-DTS-1 scenario) from the adaptive filter length selection processor 107. The first output of the MIC-BRC processor 105 provides a combination of residual channels associated with the received GMSK signal approximated as a BPSK signal. The second output of the MIC-BRC processor 105 provides a projected output of the received GMSK signal approximated as a BPSK signal.

The adaptive filter length selection processor 107 includes an input connected to the first output of the MIC-BRC processor 105, and an output connected to the second input of the MIC-BRC processor 105. The adaptive filter length selection processor 107 uses the combination of residual channels provided by the MIC-BRC processor 105 to determine whether the combination of residual channels is associated with a DTS-1 scenario or not. If the combination of residual channels is associated with the DTS-1 scenario, the adaptive filter length selection processor 107 signals the MIC-BRC processor 105 to employ a longer filter. If the combination of residual channels is associated with a scenario other than the DTS-1 scenario, the adaptive filter length selection processor 107 signals the MIC-BRC processor 105 to employ a shorter filter.

The MLSE equalizer 109 includes a first input connected to the first output of the MIC-BRC processor 105, a second input connected to the second output of the MIC-BRC processor 105, a first output, and a second output. The first input of the MLSE equalizer 109 receives the combination of the residual channels from the MIC-BRC processor 105. The second input of the MLSE equalizer 109 receives the filtered BPSK approximation of the received GSMK signal from the MIC-BRC processor 105. The first output of the MLSE equalizer 109 provides a hard decision associated with an ISI-removed filtered output of the MIC-BRC processor 105. The second output of the MLSE equalizer 109 provides a soft decision associated with the ISI-removed filtered output of the MIC-BRC processor 105.

The ICM based LLR scaling processor 111 includes a first input connected to the first output of the MIC-BRC processor 105, a second input connected to the second output of the MIC-BRC processor 105, a third input connected to the first output of the MLSE equalizer 109, a fourth input connected to the second output of the MLSE equalizer 109, and an output which provides an LLR scaling of the ISI-removed filtered output of the MIC-BRC processor 105, where the ICM based LLR scaling processor 111 estimates an LLR scaling factor.

The burst combiner and de-interleaver 113 includes an input connected to the output of the ICM based LLR scaling processor 111, and an output. The burst combiner and de-interleaver 113 receives LLR scaled ISI-removed filtered signals for different GMSK bursts at the input of the burst combiner and de-interleaver 113. The burst combiner and de-interleaver 113 combines and de-interleaves the combined GMSK bursts to reconstruct the timeslot associated with the different GMSK bursts and provides the same at the output of the burst combiner and de-interleaver 113.

The Viterbi decoder and CRC processor 115 includes an input connected to the output of the burst combiner and de-interleaver 113, and an output. The Viterbi decoding and CRC processor 115 receives the reconstructed timeslot of the different GMSK bursts and decodes the reconstructed timeslot to recover information contained in the GMSK bursts.

Figure 2:
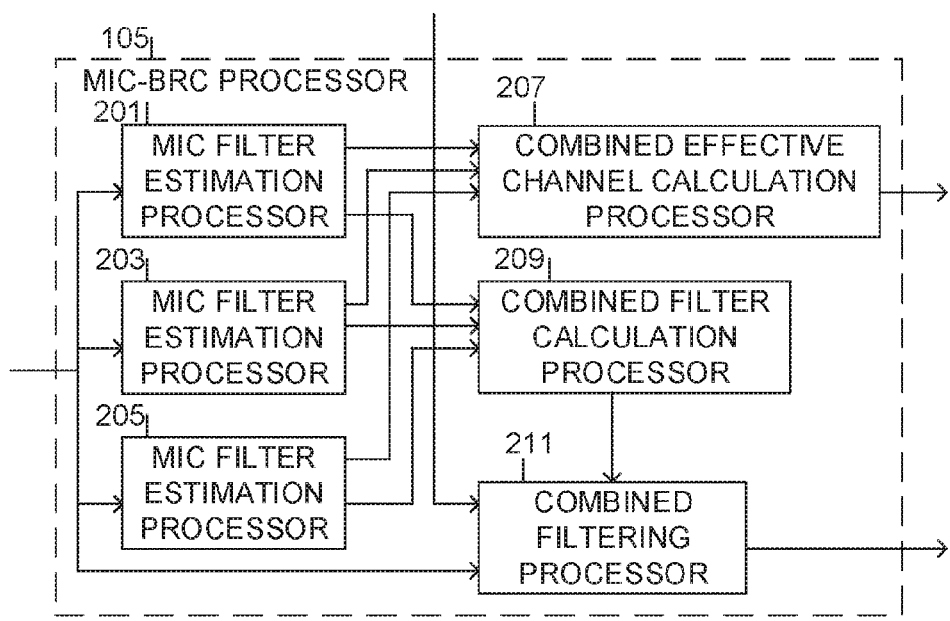
FIG. 2 is a block diagram of an MIC-BRC processor of FIG. 1, according to an embodiment of the present disclosure.

FIG. 2 is a block diagram of the MIC-BRC processor 105 of FIG. 1, according to an embodiment of the present disclosure.

Referring to FIG. 2, the MIC-BRC processor 105 includes three MIC filter estimation processors 201, 203, and 205, a combined effective channel calculation processor 207, a combined filter calculation processor 209, and a combined filtering processor 211. FIG. 2 illustrates three MIC filter estimation processors 201, 203, and 205. However, the present disclosure is not limited to using three MIC filter estimation processors 201, 203, and 205, but may use any number of MIC filter estimation processors.

Each MIC filter estimation processor 201, 203, and 205, or virtual channel is referred to as a branch, and is formulated by choosing a different equalizer delay $k_0$ for each branch. Each MIC filter estimation processor 201, 203, and 205, or virtual channel, includes a input connected to the output of the GMSK signal de-rotation processor 103, a first output for outputting a residual channel $h_i$ for the corresponding branch, and a second output for providing an estimated filter $p_i$ for the corresponding branch.

Figure 3:
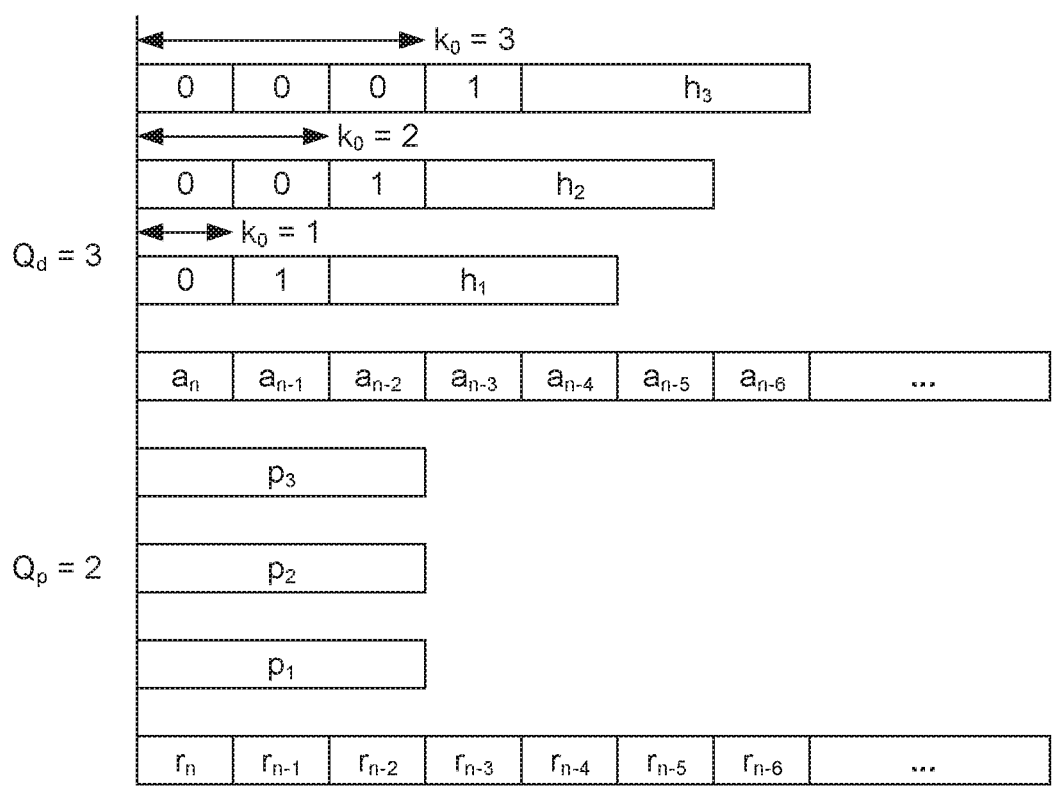
FIG. 3 is an illustration of the MIC-BRC processor of FIG. 1 with $Q_p=2$, $Q_d=3$, and $k_0=1$, 2, and 3, according to an embodiment of the present disclosure.

FIG. 3 is an illustration of the MIC-BRC processor 105 of FIG. 1 with $Q_p=2$, $Q_d=3$, and $k_0=1, 2$, and 3, according to an embodiment of the present disclosure. As illustrated in FIG. 3, the equalizer delays for the MIC filter estimation processors 201, 203, and 205, respectively, are $k_0=1, 2$ and 3. Thus, three branches are formulated as expressed in Equations (4), (5), and (6) as follows:

$$p_1 * r = h_1 a + e_1 \quad (4)$$

$$p_2 * r = h_2 a + e_2 \quad (5)$$

$$p_3 * r = h_3 a + e_3 \quad (6)$$

where a is a non-return-to-zero (NRZ) signal vector of a burst (including unknown data and known training symbols), r is a received signal vector, $p_i$ is a length $Q_p+1$ vector, $h_i$ is a length $Q_d+i+1$ vector, and * is a convolution operation.

The MIC method requires a selection of one or more of the following parameters: $Q_p$ where $(Q_p+1)$ is the length of complex projection filter (or $2K(Q_p+1)$ if including both I and Q components and oversample rate K; $Q_d$ where $Q_d+1$ is the length of the residue channel $h_{res}$ after projection; and $k_0$ where $k_0$ is the equalizer delay of input data relative to the received symbols.

If there is a sufficiently large number of training symbols and the channel is static within a burst, then using a higher $Q_p$ and $Q_d$ would be beneficial. However, in a typical GSM system, each burst has only 26 training symbols. $2K(Q_p+1)+KQ_d$ real parameters must be determined, where $K=2$ is an over sample rate. As the number of parameters increases, degradation due to inaccurate parameters might outweigh the benefit of using a longer filter length. For a single dominant interference case (e.g., downlink advanced receiver performance (DARP) test scenario 1 (DTS-1)), it may be better to use $Q_p=2$ and $Q_d=3$ in an embodiment of the present disclosure. For other cases (e.g., DARP test scenario 2 (DTS-2) for synchronous multiple interferers), it may be better to use $Q_p=1$ and $Q_d=2$.

According to the MIC method, $p_i$ and $h_i$ are solutions to the problem for the training symbol part as expressed in Equation (7) as follows:

$$\min_{p_i, h_i} \|p_i * r - h_i * a\|^2 \quad (7)$$

for $i=1, 2,$ and 3, subject to the constraint that the first $i$ components of $h_i$ are equal to 0 and the $i+1^{th}$ component is equal to 1, as expressed in Equation (8) as follows:

$$h_i[k] = 0, k \leq i, h_i[i+1] = 1, i = 1,2,3 \quad (8)$$

The combined effective channel calculation processor 207 includes an input connected to each of the first outputs of each the MIC filter estimation processors 201, 203, and 205 for receiving the residual channel $h_i$ of each of the MIC filter estimation processors 201, 203, and 205, and an output which provides a combined channel, or residual channel, of the MIC filter estimation processors 201, 203, and 205. In the example illustrated in FIG. 2, there are three MIC filter estimation processors 201, 203, and 205. However, the present disclosure is not limited to using three MIC filter estimation processors 201, 203, and 205, but may use any number of MIC filter estimation processors.

The combined filter calculation processor 209 includes an input connected to each of the second outputs of each the MIC filter estimation processors 201, 203, and 205 for receiving the estimated filter $p_i$ of each of the MIC filter estimation processors 201, 203, and 205, and an output which provides a combined filter of the MIC filter estimation processors 201, 203, and 205.

In an embodiment of the present disclosure, each branch is passed through its corresponding matched filter of $h_i$ (denoted by $h_i^m$) and then diversity combining with weight $$\frac{1}{\|e_i\|^2}$$

is performed, where $e_i$ is a residue error, as expressed in Equation (9) as follows:

$$\sum_{i=1}^{3} \left[ \frac{h_i^m}{\|e_i\|^2} * (p_i * r) \right] = \sum_{i=1}^{3} \left[ \frac{h_i^m}{\|e_i\|^2} * (h_i * a) \right] + \sum_{i=1}^{3} \frac{h_i^m}{\|e_i\|^2} e_i \quad (9)$$

or equivalently as expressed in Equation (10) as follows:

$$\left( \sum_{i=1}^{3} \frac{h_i^m}{\|e_i\|^2} * p_i \right) * r = \left( \sum_{i=1}^{3} \frac{h_i^m}{\|e_i\|^2} * h_i \right) * a + \sum_{i=1}^{3} \frac{h_i^m}{\|e_i\|^2} e_i \quad (10)$$

where a combined channel is expressed as $$\left( \sum_{i=1}^{3} \frac{h_i^m}{\|e_i\|^2} * h_i \right)$$

and a combined filter is expressed as $$\left( \sum_{i=1}^{3} \frac{h_i^m}{\|e_i\|^2} * p_i \right).$$

To further reduce complexity, equal weight combining may be used in an embodiment of the present disclosure instead of weighted combining among branches.

The combined filter processor 211 includes a first input connected to the output of the combined filter calculation processor 209 for receiving the combined filter of the MIC filter estimation processors 201, 203, and 205, a second input connected to the output of the adaptive filter length selection processor 107 for determining the filter length of the combined filter processor 211 and, thus, the filter length of the MIC-BRC processor 105, a third input connected to the output of the GMSK signal de-rotation processor 103 for receiving a de-rotated received signal, and an output for providing a filtered de-rotated received signal, or matched filter output of the MIC-BRC processor 105.

Figure 4:
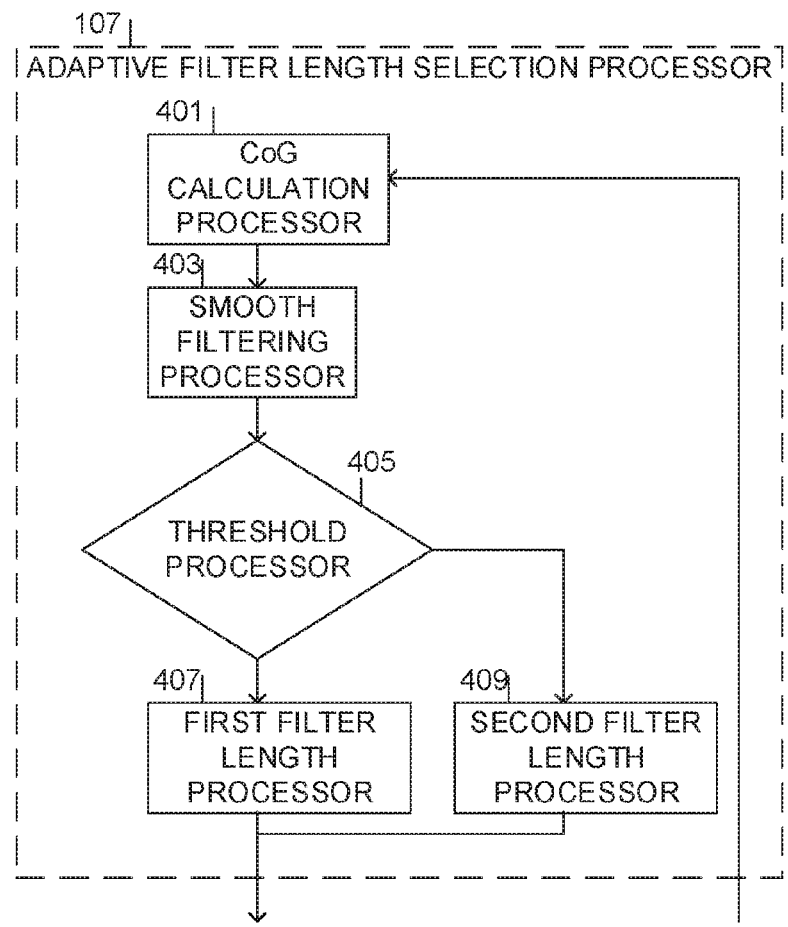
FIG. 4 is a block diagram of an adaptive filter length selection processor of FIG. 1, according to an embodiment of the present disclosure.

FIG. 4 is a block diagram of the adaptive filter length selection processor 107 of FIG. 1, according to an embodiment of the present disclosure.

The adaptive filter length selection processor 107 includes a center of gravity (COG) calculation processor 401, a smooth filter processor 403, a threshold (Th) processor 405, a first filter length processor 407, and a second filter length processor 409.

The CoG calculation processor 401 includes an input connected to the first output of the MIC-BRC processor 105 (i.e., a combination of residual channels $h_{res}$ associated with the received GMSK signal approximated as a BPSK signal), and an output.

In an embodiment of the present disclosure, the CoG of $h_{res}$ is selected as a metric for DTS-1 detection. CoG may be calculated in Equation (11) as follows:

$$CoG = \frac{\sum_{k=0}^{k=Qd} k |h_{res}(k)|^2}{\sum_{k=0}^{k=Qd} |h_{res}(k)|^2} \quad (11)$$

The smooth filtering processor 403 includes an input connected to the output of the CoG calculation processor, and an output. The smooth filtering processor 403 reduces randomness of the CoG. In an embodiment of the present disclosure, the smooth filtering processor 403 may be a single tap infinite impulse response (IIR) filter.

The threshold processor 405 includes an input connected to the output of the smooth filtering processor 403, a first output, and a second output. The output of the smooth filtering processor 403 (i.e., a filtered CoG value) is compared to a pre-determined threshold Th. If the filtered CoG is greater than the threshold, DTS-1 is detected and indicated on the first output of the threshold processor 405. If the filtered CoG is less than the threshold, non-DTS-1 is detected and indicated on the second output of the threshold processor 405.

The first filter length processor 407 includes an input connected to the first output of the threshold processor 405, and an output connected to the output of the adaptive filter length selection processor 107. If the input to the first filter length processor 407 indicates that DTS-1 is detected then the output of the adaptive filter length selection processor 107, which is connected to the second input of the combined filtering processor 211 of the MIC-BRC processor 105, indicates that the MIC-BRC processor 105 may use a longer filter length.

The second filter length processor 409 includes an input connected to the second output of the threshold processor 405, and an output connected to the output of the adaptive filter length selection processor 107. If the input to the second filter length processor 409 indicates that non-DTS-1 is detected then the output of the adaptive filter length selection processor 107, which is connected to the second input of the combined filtering processor 211 of the MIC-BRC processor 105, indicates that the MIC-BRC processor 105 may use a shorter filter length.

Since each burst within a code block typically experiences different fading conditions, scaling of soft decisions of the MLSE equalizer 109 is required to estimate an actual LLR. A conventional method uses a part of a known training sequence to estimate LLR scaling.

Figure 5:
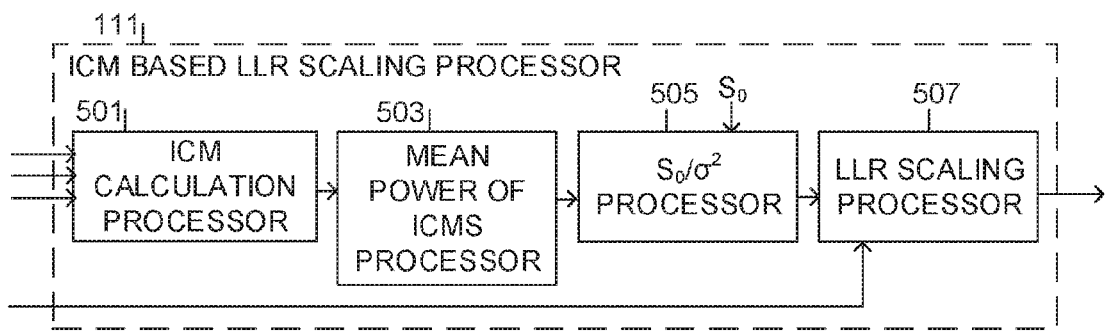
FIG. 5 is a block diagram of an interference cancelled metric (ICM) based log-likelihood ratio (LLR) scaling processor of FIG. 1, according to an embodiment of the present disclosure.

FIG. 5 is a block diagram of the ICM based LLR scaling processor 111 of FIG. 1, according to an embodiment of the present disclosure.

Referring to FIG. 5, the ICM based LLR scaling processor 111 includes an ICM cancellation processor 501, a mean power of ICMs processor 503, an $s_0/\sigma^2$ processor 505, and an LLR scaling processor 507.

The ICM calculation processor 501 includes a first input connected to the first output of the MIC-BRC processor 105, a second input connected to the second output of the MIC-BRC processor 105, a third input connected to the first output of the MLSE equalizer 109 for receiving the hard decision of the MLSE equalizer 109, and an output that provides an ICM based on the combined channel of the MIC-BRC processor 105, the combined filter of the MIC-BRC processor 105, and the hard decision of the MLSE equalizer 109.

The mean power of ICMs processor 503 includes an input connected to the output of the ICM calculation processor 501, and an output that provides a mean power of the ICMs received from the ICM calculation processor 501.

The $s_0/\sigma^2$ processor 505 includes a first input connected to the output of the mean power of ICMs processor 503, a second input for receiving $s_0$, and an output for providing $s_0$ divided by the square of the variance of the ICM ($\sigma^2$), which is an estimate of LLR scaling. The variance of the ICM provides an estimate of the variance of the soft decision of the MLSE equalizer 109 and the sum of the power of the effective channel provides an estimate of $s_0$. In an embodiment of the present disclosure, $s_0$ is an equivalent channel input response $s_l$ after matched filtering and branch combining for l=0. $s_0$ may be approximated as $\|h_{res}\|^2$.

The LLR scaling processor 507 includes a first input connected to the output of the $s_0/\sigma^2$ processor 505, a second input connected to the second output of the MLSE equalizer 109 for receiving the soft decision of the MLSE equalizer 109, and an output for applying the LLR scaling provided by the $s_0/\sigma^2$ processor 505 to the soft output of the MLSE equalizer 109.

ICM based LLR scaling uses the hard decision of data symbols to calculate the ICM. The ISI of the matched filter output of the MIC-BRC processor 105 is removed using the hard decision of the MLSE equalizer 109. In an embodiment of the present disclosure, $y_i$, i=0, 1, . . . , 147 is the matched filter output of the MIC-BRC processor 105, where the matched filter output of the MIC-BRC processor 105 is expressed as in Equation (12) as follows:

$$y_i = \sum_{l \in [-Q_d, Q_d]} a_{i-l} s_l + n_i \quad (12)$$

where $a_i \in \{-1,1\}$, i=0, 1, . . . , 147 is the transmission (Tx) symbols, and $s_l$, l=$-Q_d$, . . . , $-1,0,+1$, . . . , $Q_d$ is the equivalent channel impulse response after matched filtering and branch combing, which may be pre-computed as part of a Viterbi table computation for the MLSE equalizer 109. Inference cancelled metric (ICM) $Y_{ICM,i}$ is calculated by removing the ISI items in Equation (12) above using the hard decision of the MLSE equalizer 109 as expressed in Equation (13) as follows:

$$Y_{ICM,i} := \hat{a}_i \left( y_i - \sum_{l \in [-Q_d, Q_d]} \hat{a}_{i-l} s_l \right) \quad (13)$$

where $\hat{a}_i$, i=0,1, . . . , 147 is the hard-decision of Tx symbols based on the MLSE equalizer 109 output.

If the MLSE equalizer 109 hard decisions are perfect, then from Equations (12) and (13) above $Y_{ICM,i}$ may be expressed as in Equation (14) as follows:

$$Y_{ICM,i} = a_i n_i \quad (14)$$

LLR scaling may be calculated as in Equation (15) as follows, where the first and last three ICMs are not used.

$$LLR_{scale} = \frac{142 s_0}{\sum_{i=3}^{144} Y_{ICM,i} Y_{ICM,i}} \quad (15)$$

Figure 6:
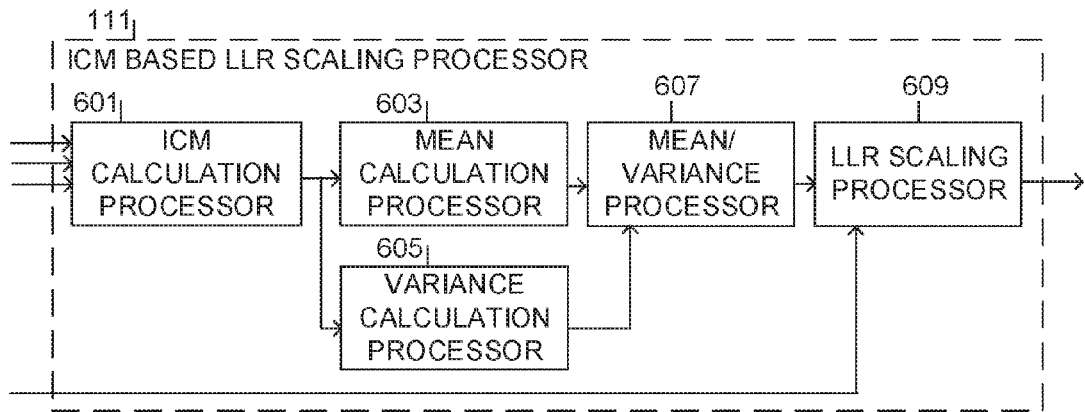
FIG. 6 is a block diagram of the ICM based LLR scaling processor of FIG. 1, according to an embodiment of the present disclosure.

FIG. 6 is a block diagram of the ICM based LLR scaling processor 111 of FIG. 1, according to an embodiment of the present disclosure.

Referring to FIG. 6, the ICM based LLR scaling processor 111 includes an ICM cancellation processor 601, a mean calculation processor 603, a variance calculation processor 605, a mean/variance calculation processor 607, and an LLR scaling processor 609.

The ICM calculation processor 601 includes a first input connected to the first output of the MIC-BRC processor 105, a second input connected to the second output of the MIC-BRC processor 105, a third input connected to the first output of the MLSE equalizer 109 for receiving the hard decision of the MLSE equalizer 109, and an output that provides an ICM based on the combined channel of the MIC-BRC processor 105, the combined filter of the MIC-BRC processor 105, and the hard decision of the MLSE equalizer 109.

The mean calculation processor 603 includes an input connected to the output of the ICM calculation processor 601, and an output that provides a mean of the ICMs received from the ICM calculation processor 601.

The variance calculation processor 605 includes an input connected to the output of the ICM calculation processor 601, and an output that provides a variance of the ICMs received from the ICM calculation processor 601.

The mean/variance processor 607 includes a first input connected to the output of the mean calculation processor 603, a second input connected to the output of the variance calculation processor 605, and an output for providing the mean of the ICMs received from the ICM calculation processor 601 divided by the variance of the ICMs received from the ICM calculation processor 601), which is an estimate of LLR scaling.

The LLR scaling processor 609 includes a first input connected to the output of the mean/variance processor 607, a second input connected to the second output of the MLSE equalizer 109 for receiving the soft decision of the MLSE equalizer 109, and an output for applying the LLR scaling to the soft decision of the MLSE equalizer 109.

If the hard decisions of the MLSE equalizer 109 are perfect, the two-sided (past and future) ISI will be cancelled completely in Equation (13) above. Then, from Equation (12) above, an expression for the ICM may be expressed as in Equation (16) as follows:

$$Y_{ICM,i} = s_0 + a_i n_i \tag{16}$$

The LLR scaling calculation may be expressed as in Equation (17) as follows:

$$LLR_{scale} = \frac{\text{mean}(Y_{ICM,i=3:144})}{\text{var}(Y_{ICM,i=3:144})} \tag{17}$$

Figure 7:
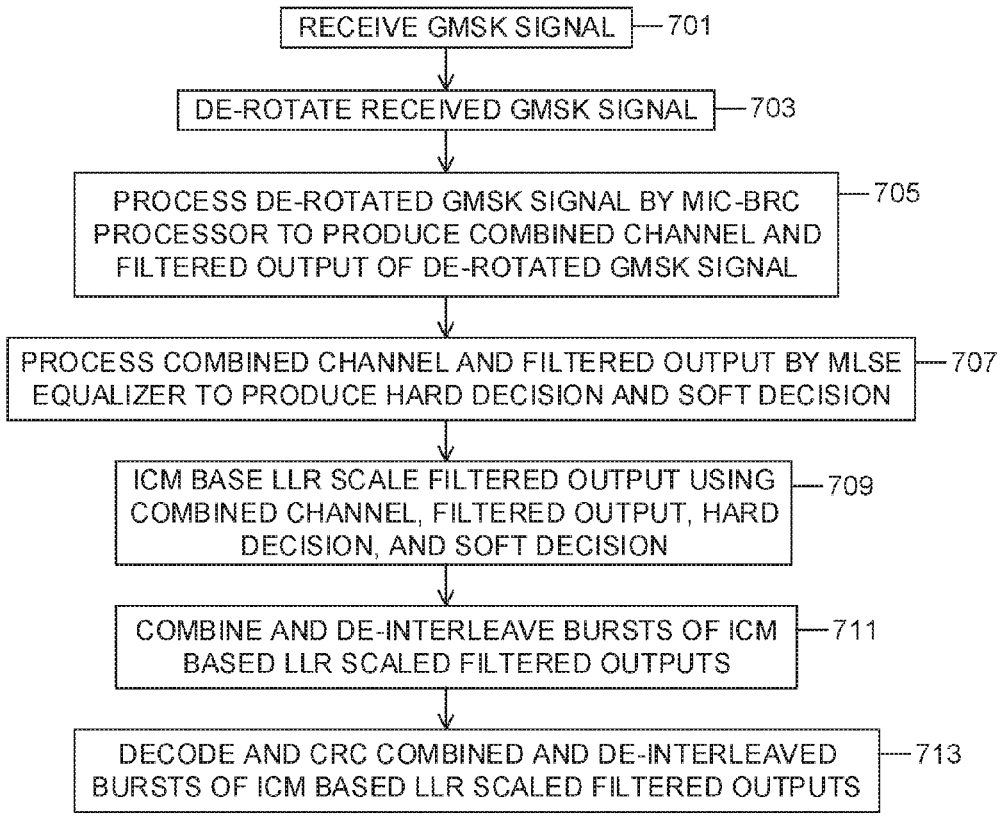
FIG. 7 is a flowchart of a method of for SAIC enhancement in a GSM user equipment (UE) receiver, according to an embodiment of the present disclosure.

FIG. 7 is a flowchart of a method of for SAIC enhancement in a GSM UE receiver, according to an embodiment of the present disclosure.

Referring to FIG. 7, a GMSK signal is received by a front end receiver at 701.

At 703, the received GMSK signal is de-rotated by a GMSK de-rotation processor at 703.

At 705, the de-rotated GMSK signal is processed by a MIC-BRC processor to produce a combined channel and a filtered output of the de-rotated GMSK signal, where the length of the filter is determined using the combined channel and the filtered output by an adaptive filter length selection processor.

At 707, the combined channel and the filtered output are processed by an MLSE equalized to produce a hard output and a soft output.

At 709, the filtered output is ICM based LLR scaled by an ICM based LLR scaling processor using the combined channel, the filtered output, the hard decision, and the soft decision.

At 711, bursts of LLR scaled filtered outputs are combined and de-interleaved by a burst combiner and de-interleaver.

At 713, the combined and de-interleaved bursts are decoded and cyclic redundancy checked by a Viterbi decoder and CRC processor.

Figure 8:
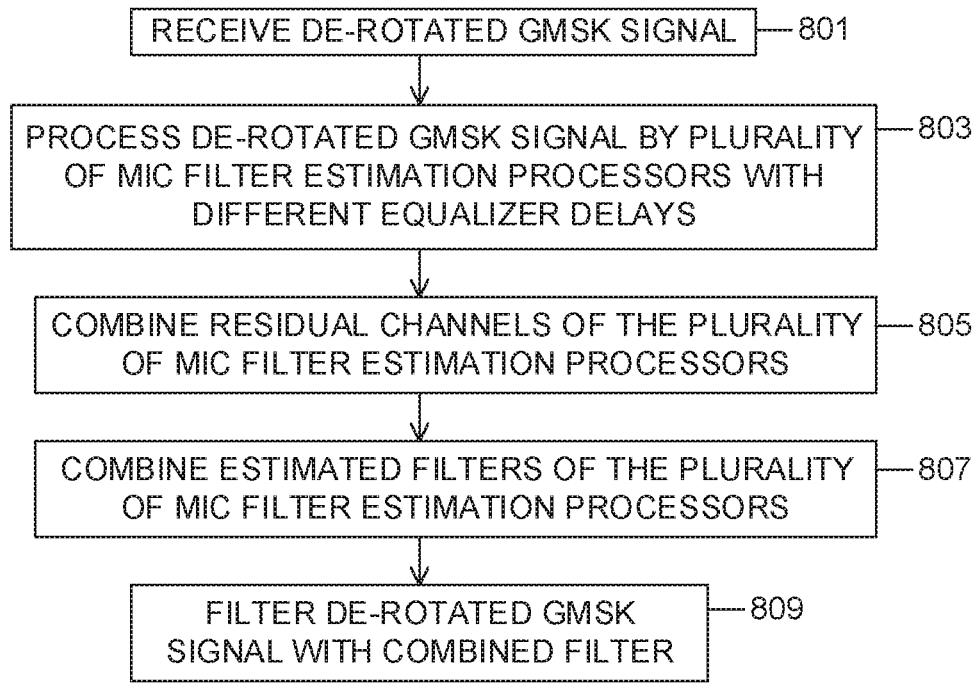
FIG. 8 is a flowchart of a method of the MIC-BRC processor of FIG. 1, according to an embodiment of the present disclosure.

FIG. 8 is a flowchart of a method of the MIC-BRC processor 105 of FIG. 1, according to an embodiment of the present disclosure.

Referring to FIG. 8, the MIC-BRC processor receives a de-rotated GMSK signal at 801.

At 803, the de-rotated GMSK signal is processed by a plurality of MIC filter estimation processors, or branches, where each branch is formulated by choosing a different equalizer delay $k_0$ for each branch, outputs a residual channel $h_i$ for the corresponding branch, and outputs an estimated filter $p_i$ for the corresponding branch. For example, three branches may be formulated as expressed in Equations (4), (5), and (6) above. However, the present disclosure is not limited to using three branches. Any number of branches may be used. In an embodiment of the present disclosure, $p_i$ and $h_i$ may be solutions to the problem for a training symbol part as expressed in Equation (7) above.

At 805, the residual channel $h_i$ of each of the branches is combined, by a combined effective channel calculation processor, to form a combined, or residual, channel, of the branches.

At 807, the estimated filter $p_i$ of each branch is combined, by a combined filter calculation processor, to form a combined filter of the branches. In an embodiment of the present disclosure, each branch is passed through its corresponding matched filter of $h_i$ (denoted by $h_i'''$) and then diversity combining with weight $$\frac{1}{\|e_i\|^2}$$

is performed, as expressed in Equation (9) or equivalently in Equation (10), above. To further reduce complexity, equal weight combining may be used in an embodiment of the present disclosure instead of weighted combining among branches.

At 809, the de-rotated GMSK signal is filtered by the combined filter, by the combined filter processor. In an embodiment of the present disclosure, the length of the combined filter is lengthened or shortened, based receiving a signal from an adaptive filter length selection processor that indicates whether the received GMSK de-rotated signal concerns a DTS-1 scenario or a non-DTS-1 scenario, respectively.

Figure 9:
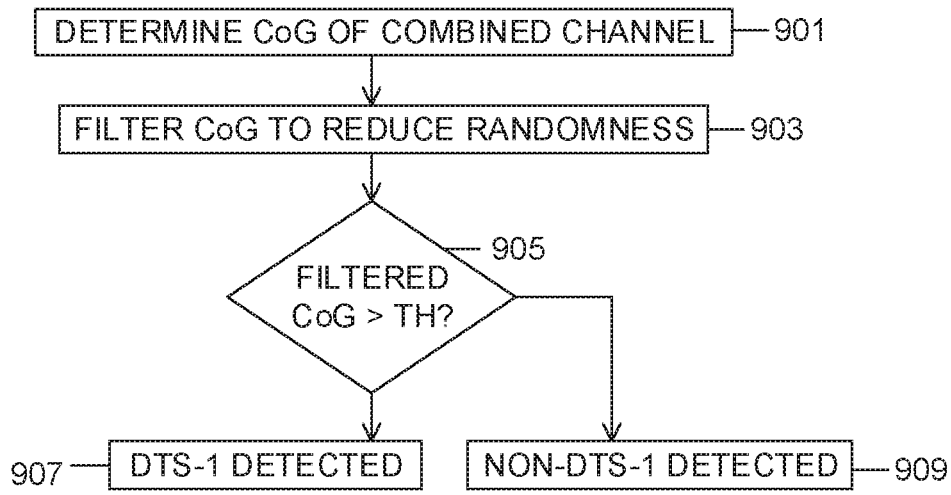
FIG. 9 is a flowchart of a method of the adaptive filter length selection processor of FIG. 1, according to an embodiment of the present disclosure.

FIG. 9 is a flowchart of a method of the adaptive filter length selection processor 107 of FIG. 1, according to an embodiment of the present disclosure.

Referring to FIG. 9, a CoG of a combined, or residual, channel, of a plurality of MIC filter processors, or branches, is determined by a center of gravity (CoG) calculation processor at 901. In an embodiment of the present disclosure, the CoG of $h_{res}$ is selected as a metric for DTS-1 detection. CoG may be calculated as in Equation (11) above.

At 903, the CoG is filtered to reduce randomness by a smooth filtering processor. In an embodiment of the present disclosure, the CoG may be filtered by a single tap IIR filter.

At 905, the filtered CoG is compared to a pre-determined threshold Th by a filtered CoG>Th processor.

If the filtered CoG is greater than the threshold, DTS-1 is detected at 907.

If the filtered CoG is less than the threshold, non-DTS-1 is detected at 909.

FIG. 1 is a flowchart of a method of the ICM based LLR scaling processor 111 of FIG. 1, according to an embodiment of the present disclosure.

Figure 10:
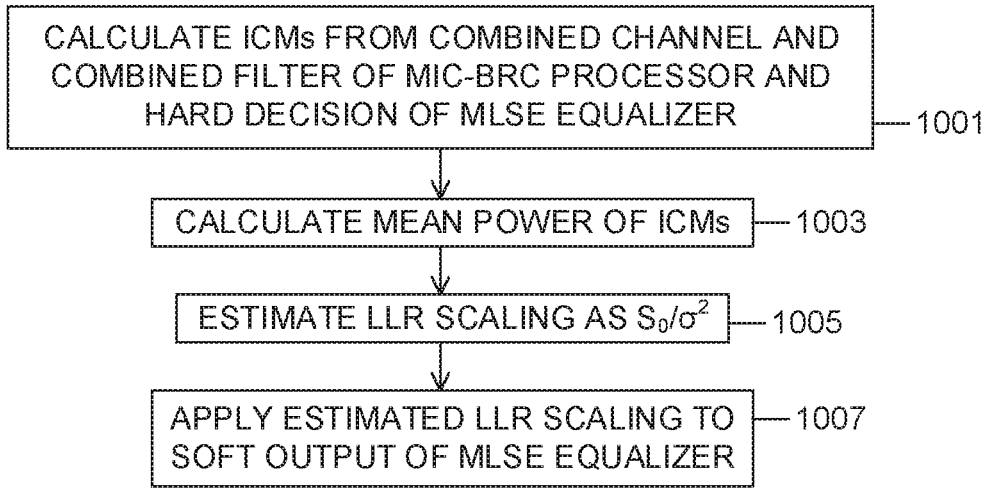
FIG. 10 is a flowchart of a method of the ICM based LLR scaling processor of FIG. 1, according to an embodiment of the present disclosure.

Referring to FIG. 10, ICMs are calculated from a combined channel of the MIC-BRC processor 105, the combined filter of the MIC-BRC processor 105, and a hard decision of the MLSE equalizer 109 by an ICM calculation processor at 1001.

At 1003, a mean power of ICMs is calculated by a mean power of ICMs processor.

At 1005, an LLR scaling is estimated by dividing $s_0$ with $\sigma^2$ by an $s_0/\sigma^2$ processor. A sum of the power of the effective channel provides an estimate of $s_0$. In an embodiment of the present disclosure, $s_0$ is an equivalent channel input response $s_i$ after matched filtering and branch for l=0. $s_0$ may be approximated as $\|h_{res}\|^2$.

At 1007, the estimated LLR scaling is applied to a soft output of an MLSE equalizer by an LLR scaling processor.

FIG. 1 is a flowchart of a method of the ICM based LLR scaling processor 111 of FIG. 1, according to an embodiment of the present disclosure.

Figure 11:
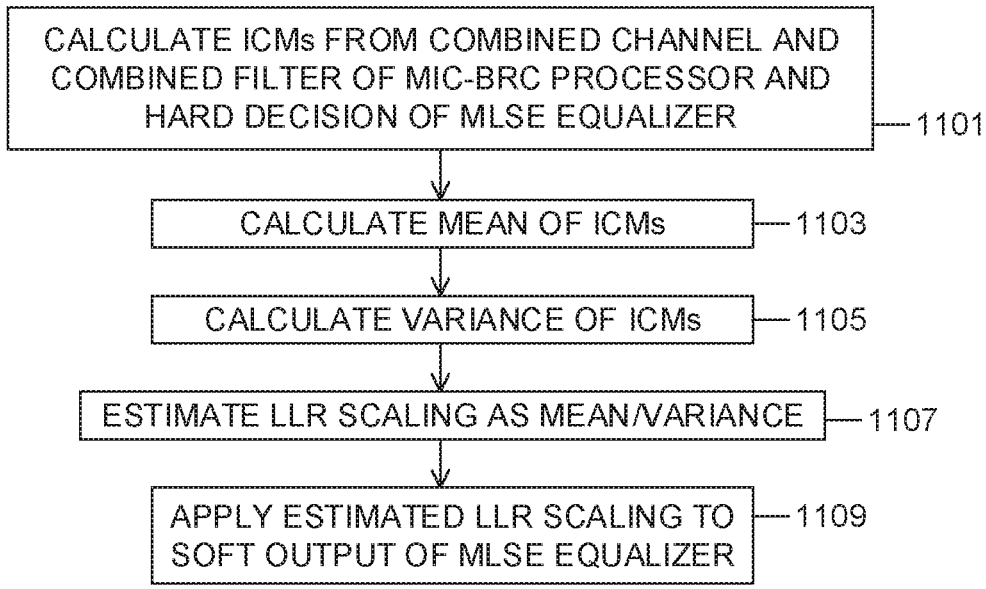
FIG. 11 is a flowchart of a method of the ICM based LLR scaling processor of FIG. 1, according to an embodiment of the present disclosure.

Referring to FIG. 11, ICMs are calculated from a combined channel of the MIC-BRC processor 105, the combined filter of the MIC-BRC processor 105, and a hard decision of the MLSE equalizer 109 by an ICM calculation processor at 1101.

At 1103, a mean of ICMs is calculated by a mean calculation processor.

At 1105, a variance of ICMs is calculated by a variance calculation processor.

At 1107, an LLR scaling is estimated by dividing the mean of the ICMs with the variance of the ICMs by an LLR scaling processor.

At 1109, the estimated LLR scaling is applied to a soft output of an MLSE equalizer by an LLR scaling processor.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An interference cancelation (IC) processor, comprising:
a plurality of mono interference cancellation (MIC) filter estimation processors, wherein each of the plurality of MIC filter estimation processors has a different equalizer offset $k_0$ and includes an input connected to a first input of the IC processor, a first output that provides a residual channel $h_i$, and a second output that provides an estimated filter $p_i$;
a combined effective channel calculation processor, including a plurality of inputs, wherein each of the plurality of inputs is connected to one of the first outputs of the plurality of MIC filter estimation processors, and an output that provides a combined channel $h_{res}$ that is connected to a first output of the IC processor;
a combined filter calculation processor, including a plurality of inputs, wherein each of the plurality of inputs is connected to one of the second outputs of the plurality of MIC filter estimation processors, and an output for providing a combined filter; and
a combined filter processor, including a first input connected to the output of the combined filter calculation processor, a second input for receiving a signal for setting a length of the combined filter that is connected to a second input of the IC processor, a third input connected to the input of the IC processor, and an output for providing a filtered output of a de-rotated GMSK signal that is connected to a second output of the IC processor that provides a filtered output $y_i$ of the de-rotated GMSK signal.

2. The IC processor of claim 1, further comprising:
a front end receiver, including an input to receive a Gaussian minimum shift keying (GMSK) signal, and an output connected to the first input of the IC processor;
a GMSK signal de-rotation processor configured to de-rotate the received GMSK signal, including an input connected to the output of the front end receiver, and an output;
an adaptive filter length selection processor, including an input connected to the first output of the IC processor, and an output connected to the second input of the IC processor for determining a length of the filtered output of the de-rotated GMSK signal;
a maximum-likelihood sequence estimation (MLSE) equalizer, including a first input connected to the first output of the IC processor, a second input connected to the second output of the IC processor, a first output for providing a hard decision of the filtered output of the de-rotated GMSK signal, and a second output for providing a soft decision of the filtered output of the de-rotated GMSK signal;
an interference cancelled metric (ICM) based log-likelihood ratio (LLR) scaling processor, including a first input connected to the first output of the MIC-BRC processor, a second input connected to the second output of the IC processor, a third input connected to the first output of the MLSE equalizer, a fourth input connected to the second output of the MLSE equalizer, and an output;
a burst combiner and de-interleaver, including an input connected to the output of the ICM based LLR scaling processor, and an output; and
a Viterbi decoding and cyclic redundancy check (CRC) processor, including an input connected to the output of the burst combiner and de-interleaver, and an output.

3. The IC processor of claim 2, wherein the adaptive filter length selection processor comprises:
a center of gravity (CoG) calculation processor, including an input connected to the first output of the IC processor, and an output;
a smooth filter processor, including an input connected to the output of the CoG calculation processor, and an output;
a threshold (Th) processor, including an input connected to the output of the smooth filtering processor, a first output, and a second output;
a first filter length processor, including an input connected to the first output of the threshold processor, and an output connected to the output of the adaptive filter length selection processor; and
a second filter length processor, including an input connected to the second output of the threshold processor, and an output connected to the output of the adaptive filter length selection processor.

4. The IC processor of claim 3, wherein the CoG is calculated as $$CoG = \frac{\sum_{k=0}^{k=Q_d} k|h_{res}(k)|^2}{\sum_{k=0}^{k=Q_d} |h_{res}(k)|^2}.$$

5. The IC processor of claim 3, wherein the first filter length processor determines whether the de-rotated GMSK signal concerns a downlink advanced receiver performance (DARP) test scenario (DTS) for synchronous single co-channel interference (DTS-1), and wherein the second filter length processor determines if the de-rotated GMSK signal does not concern DTS-1.

6. The IC processor of claim 2, wherein the ICM based LLR scaling processor comprises:
an ICM calculation processor, including a first input connected to the first output of the IC processor, a second input connected to the second output of the IC processor, a third input connected to the first output of the MLSE equalizer, and an output for providing an ICM metric $Y_{ICM,i}$;
a mean power of ICMs processor, including an input connected to the output of the ICM calculation processor, and an output;
an $s_0/\sigma 2$ processor, including a first input for receiving an equivalent channel input response $s_0$, a second input connected to the output of the mean power of ICMs processor, and an output; and
an LLR scaling processor, including a first input connected to the output of the $s_0/\sigma 2$ processor, a second input connected to the second output of the MLSE equalizer, and an output connected to the output of the ICM based LLR scaling processor.

7. The IC processor of claim 6, wherein the ICM metric $Y_{ICM,i}$ is $$Y_{ICM,i} := \hat{a}_i \left( y_i - \sum_{l \in [-Q_d, Q_d]} \hat{a}_{i-l} s_l \right)$$

wherein $\hat{a}_i$, i=0, 1, ..., 147 is the hard decision of the MLSE equalizer, and
$s_l$, $l=Q_d, \ldots, 1, 0, +1, \ldots, Q_d$ is an equivalent channel impulse response after matched filtering and branch combing.

8. The IC processor of claim 2, wherein the ICM based LLR scaling processor comprises:
an ICM calculation processor, including a first input connected to the first output of the IC processor, a second input connected to the second output of the IC processor, a third input connected to the first output of the MLSE equalizer, and an output for providing an $Y_{ICM,i}$;
a mean calculation processor, including an input connected to the output of the ICM calculation processor, and an output;
a variance calculation processor, including an input connected to the output of the ICM calculation processor, and an output;
a mean/variance processor, including a first input connected to the output of the mean calculation processor, a second input connected to the output of the variance calculation processor, and an output; and
an LLR scaling processor, including a first input connected to the output of the mean/variance processor, a second input connected to the second output of the MLSE equalizer, and an output connected to the output of the ICM based LLR scaling processor.

9. The IC processor of claim 2, wherein the ICM based LLR scaling processor comprises:
an ICM calculation processor, including a first input connected to the first output of the IC processor, a second input connected to the second output of the IC processor, a third input connected to the first output of the MLSE equalizer, and an output for providing an ICM metric $Y_{ICM,i}$;
a mean power of ICMs processor, including an input connected to the output of the ICM calculation processor, and an output;
an $s_0/\sigma 2$ processor, including a first input for receiving an equivalent channel input response $s_0$, a second input connected to the output of the mean power of ICMs processor, and an output; and
an LLR scaling processor, including a first input connected to the output of the $s_0/\sigma 2$ processor, a second input connected to the second output of the MLSE equalizer, and an output connected to the output of the ICM based LLR scaling processor.

10. The IC processor of claim 1, wherein $p_i$ and $h_i$ are solutions to $$\min_{p_i, h_i} \| p_i * r - h_i * a \|^2$$

wherein i are integers from 1 to the plurality of MIC filter estimation processors, wherein a first i components of $h_i$ are equal to 0 and an i+1$^{th}$ component is equal to 1, a is a non-return-to-zero (NRZ) signal vector of a burst including unknown data and known training symbols, r is a received signal vector, $p_i$ is a length $Q_p+1$ vector, $h_i$ is a length $Q_d$ i+1 vector, * is a convolution operation, $Q_p$ is an integer for determining a length of a filter, and $Q_d$ is an integer for determining a length of a channel.

11. The IC processor of claim 1, wherein the combined effective channel calculation processor is configured to perform diversity combining with weight $$\frac{1}{\|e_i\|^2},$$

wherein $e_i$ is a residue error, the combined channel is expressed as $$\left( \sum_{i=1}^{3} \frac{h_i^m}{\|e_i\|^2} * h_i \right),$$

and the combined filter is expressed as $$\left( \sum_{i=1}^{3} \frac{h_i^m}{\|e_i\|^2} * p_i \right).$$

12. A method of combining channels of a de-rotated GMSK signal by an interference cancellation (IC) processor, comprised of:
filtering the de-rotated GMSK signal by the IC processor, wherein a length of the filtered output of the de-rotated GMSK signal is determined by an adaptive filter length selection processor;
generating a residual channel $h_i$ for the de-rotated GMSK signal by each of a plurality of mono interference cancellation (MIC) filter estimation processors, wherein each of the plurality of MIC filter estimation processors has a different non-zero equalizer offset $k_0$; and generating a combined channel $h_{res}$ from each residual channel $h_i$ by a combined effective channel calculation processor.

13. The method of claim 12, further comprising:
receiving a Gaussian minimum shift keying (GMSK) signal by a front end receiver;
de-rotating the received GMSK signal by a GMSK signal de-rotation processor;
determining a hard decision and a soft decision of the filtered de-rotated GMSK signal by a maximum-likelihood sequence estimation (MLSE) equalizer;
determining an interference cancelled metric (ICM) by ICM based log-likelihood ratio (LLR) scaling processor using the combined channel, the filtered de-rotated GMSK signal, and the hard and soft decisions of the filtered de-rotated GMSK signal;
combining and de-interleaving bursts of ICMs by a combiner and de-interleaver; and
decoding and cyclic redundancy checking the combined and de-interleaved bursts by a Viterbi decoding and cyclic redundancy check (CRC) processor.

14. The method of claim 13, wherein determining the length of the filtered output of the de-rotated GMSK signal comprises:
determining a center of gravity (CoG) for a combined channel $h_{res}$ by a CoG calculation processor;
filtering the CoG by a smooth filter processor;
determining if the filtered CoG is greater than a threshold Th by a threshold (Th) processor;
if the CoG is greater than Th then determining that the de-rotated GMSK signal concerns a downlink advanced receiver performance (DARP) test scenario (DTS) for synchronous single co-channel interference (DTS-1) and that a longer combined filter should be used, by a first filter length processor; and
if the CoG is less than Th then determining that the de-rotated GMSK signal does not concern DTS-1 and that a shorter combined filter should be used, by a second filter length processor.

15. The method of claim 14, wherein the CoG is calculated as $$CoG = \frac{\sum_{k=0}^{k=Q_d} k|h_{res}(k)|^2}{\sum_{k=0}^{k=Q_d} |h_{res}(k)|^2}.$$

16. The method of claim 13, wherein determining an interference cancelled metric (ICM) by the ICM based LLR scaling processor comprises:
calculating ICMs $Y_{ICM,i}$ by an ICM calculation processor, using the combined channel and the combined filter of the IC processor and the hard and soft decisions of MLSE equalizer;
calculating a mean of the ICMs by a mean calculation processor;
calculating a variance of the ICMs by a variance calculation processor;
generating an LLR scaling factor by dividing the mean of the ICMs by the variance of the ICMs by a mean/variance processor; and LLR scaling the soft decision of the MLSE equalizer by an LLR scaling processor using the LLR scaling factor.

17. The method of claim 12, wherein filtering the de-rotated GMSK signal by the IC processor is comprised of:
generating an estimated filter $p_i$ by each of a plurality of MIC filter estimation processors, wherein each of the plurality of MIC filter estimation processors has a different equalizer offset $k_0$;
generating a combined filter from each estimated filter $p_i$ by a combined filter calculation processor; and
generating a filtered output of the de-rotated GMSK signal by filtering the de-rotated GMSK signal by the combined filter by a combined filter processor, wherein $p_i$ and $h_i$ are solutions to $$\min_{p_i, h_i} \|p_i * r - h_i * a\|^2$$

wherein i are integers from 1 to the plurality of MIC filter estimation processors, wherein a first i components of $h_i$ are equal to 0 and an $i+1^{th}$ component is equal to 1, a is a non-return-to-zero (NRZ) signal vector of a burst including unknown data and known training symbols, r is a received signal vector, $p_i$ is a length $Q_p+1$ vector, $h_i$ is a length $Q_d+i+1$ vector, * is a convolution operation, $Q_p$ is an integer for determining a length of a filter, and $Q_d$ is an integer for determining a length of a channel.

18. The method of claim 17, wherein generating the combined channel $h_{res}$ from each residual channel $h_i$ by the combined effective channel calculation processor comprising diversity combining with weight $$\frac{1}{\|e_i\|^2},$$

wherein $e_i$ is a residue error, the combined channel is expressed as $$\left(\sum_{i=1}^{3} \frac{h_i^m}{\|e_i\|^2} * h_i\right),$$

and the combined filter is expressed as $$\left(\sum_{i=1}^{3} \frac{h_i^m}{\|e_i\|^2} * p_i\right).$$

19. A method of manufacturing a semiconductor device, comprising:
forming the semiconductor device as part of a wafer or package that includes a front end receiver, including an input to receive a Gaussian minimum shift keying (GMSK) signal, and an output, a GMSK signal de-rotation processor configured to de-rotate the received GMSK signal, including an input connected to the output of the front end receiver, and an output, an interference cancellation (IC) processor, including a first input connected to the output of the GMSK signal de-rotation processor, a second input, a first output for providing a combined channel, and a second output for providing a filtered output $y_i$ of the de-rotated GMSK signal, an adaptive filter length selection processor, including an input connected to the first output of the IC processor, and an output connected to the second input of the IC processor for determining a length of the filtered output of the de-rotated GMSK signal, a maximum-likelihood sequence estimation (MLSE) equalizer, including a first input connected to the first output of the IC processor, a second input connected to the second output of the IC processor, a first output for providing a hard decision of the filtered output of the de-rotated GMSK signal, and a second output for providing a soft decision of the filtered output of the de-rotated GMSK signal, an interference cancelled metric (ICM) based log-likelihood ratio (LLR) scaling processor, including a first input connected to the first output of the IC processor, a second input connected to the second output of the IC processor, a third input connected to the first output of the MLSE equalizer, a fourth input connected to the second output of the MLSE equalizer, and an output, a burst combiner and de-interleaver, including an input connected to the output of the ICM based LLR scaling processor, and an output; and a Viterbi decoding and cyclic redundancy check (CRC) processor, including an input connected to the output of the burst combiner and de-interleaver, and an output; and testing the semiconductor device, wherein testing of the semiconductor device is performed using at least one electrical to optical converter, at least one optical splitter that splits an optical signal into at least two optical signals, and at least one optical to electrical converter.

20. A method of constructing an integrated circuit, comprising:
  generating a mask layout for a set of features for a layer of the integrated circuit, the mask layout having standard cell library macros for:
    a front end receiver, including an input to receive a Gaussian minimum shift keying (GMSK) signal, and an output;
    a GMSK signal de-rotation processor configured to de-rotate the received GMSK signal, including an input connected to the output of the front end receiver, and an output;
    an interference cancellation (IC) processor, including a first input connected to the output of the GMSK signal de-rotation processor, a second input, a first output for providing a combined channel, and a second output for providing a filtered output $y_i$ of the de-rotated GMSK signal;
    an adaptive filter length selection processor, including an input connected to the first output of the IC processor, and an output connected to the second input of the MIC BRC IC processor for determining a length of the filtered output of the de-rotated GMSK signal;
    a maximum-likelihood sequence estimation (MLSE) equalizer, including a first input connected to the first output of the IC processor, a second input connected to the second output of the IC processor, a first output for providing a hard decision of the filtered output of the de-rotated GMSK signal, and a second output for providing a soft decision of the filtered output of the de-rotated GMSK signal;
    an interference cancelled metric (ICM) based log-likelihood ratio (LLR) scaling processor, including a first input connected to the first output of the IC processor, a second input connected to the second output of the IC processor, a third input connected to the first output of the MLSE equalizer, a fourth input connected to the second output of the MLSE equalizer, and an output;
    a burst combiner and de-interleaver, including an input connected to the output of the ICM based LLR scaling processor, and an output; and
    a Viterbi decoding and cyclic redundancy check (CRC) processor, including an input connected to the output of the burst combiner and de-interleaver, and an output;
  disregarding relative positions of the macros for layout design rule compliance during generation of the mask layout;
  monitoring the relative positions of the macros for layout design rule compliance after disregarding the relative positions;
  upon detection of layout design rule noncompliance of the macros, generating an adapted mask layout by adapting the noncompliance macros for layout design rule compliance;
  generating a mask according to the adapted layout with the set of features for the layer of the integrated circuit; and
  manufacturing the integrated circuit layer according to the mask.

* * * * *